United States Patent
Kuhn

(10) Patent No.: US 7,445,186 B2
(45) Date of Patent: Nov. 4, 2008

(54) ARTICULATED SUSPENSION

(75) Inventor: Peter Kuhn, Munich (DE)

(73) Assignee: MAVIG GmbH, München (DE)

( * ) Notice: Subject to any disclaimer, the term of this patent is extended or adjusted under 35 U.S.C. 154(b) by 368 days.

(21) Appl. No.: 10/532,648

(22) PCT Filed: Oct. 22, 2003

(86) PCT No.: PCT/EP03/11707

§ 371 (c)(1),
(2), (4) Date: Apr. 25, 2005

(87) PCT Pub. No.: WO2004/038276

PCT Pub. Date: May 6, 2004

(65) Prior Publication Data

US 2006/0175513 A1      Aug. 10, 2006

(30) Foreign Application Priority Data

Oct. 25, 2002   (DE) .................................. 102 49 847

(51) Int. Cl.
*B42F 13/00* (2006.01)

(52) U.S. Cl. ...................................... 248/324; 248/343

(58) Field of Classification Search ............ 248/288.31, 248/324, 343; 403/122, 114, 115, 127, 76, 403/90; 285/261, 263, 271
See application file for complete search history.

(56) References Cited

U.S. PATENT DOCUMENTS

| 2,819,918 | A | | 1/1958 | Seaquist et al. |
| 4,203,683 | A | | 5/1980 | Rogers |
| 4,324,501 | A | * | 4/1982 | Herbenar ..................... 403/133 |
| 4,566,663 | A | | 1/1986 | Barchus |
| 4,642,123 | A | * | 2/1987 | Noiles ........................ 623/22.2 |
| 5,066,160 | A | * | 11/1991 | Wood .......................... 403/140 |
| 5,505,424 | A | | 4/1996 | Niemann |

FOREIGN PATENT DOCUMENTS

| DE | 37 20 010.0 A1 | 3/1989 |
| DE | 93 01 268.3 U1 | 1/1993 |

* cited by examiner

*Primary Examiner*—Korie Chan
*Assistant Examiner*—Steven Marsh
(74) *Attorney, Agent, or Firm*—Scully, Scott, Murphy & Presser, P.C.

(57) ABSTRACT

The invention concerns an articulated suspension, particularly adapted to display screen support systems and consisting of a suspension part (1), whereof the end (1''') has a partially spherical outer profile, a linking part (5) suspended to the suspension part (1), and a sliding part arranged between the suspension part (1) and the linking part (5), said sliding part enabling the linking part (5) to produce a pivoting and sliding tilting movement relative to the suspension part (1). The invention is characterized in that the sliding part (5) is an annular sliding band (7), whereof the thickness is constant and the inner profile corresponds to the spherical outer profile of the end (1''') of the suspension part (1). In accordance with the invention, the linking part (5) includes one end (5'') whereof the inner profile is partly spherical and corresponds to the spherical outer profile of the sliding band (7).

8 Claims, 2 Drawing Sheets

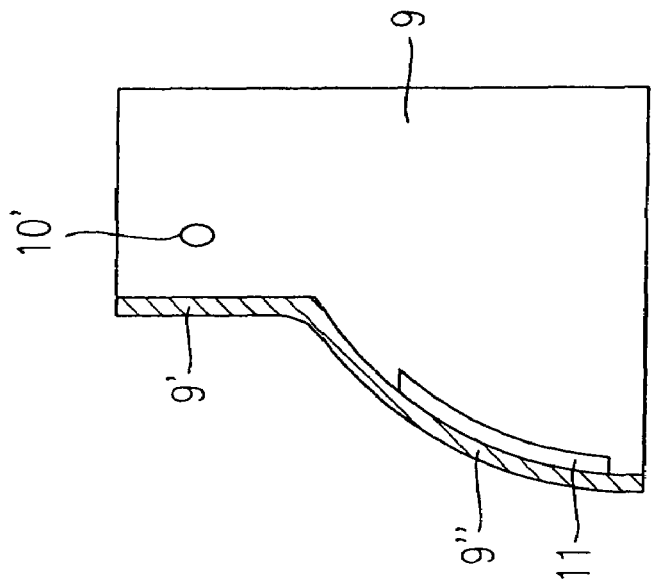
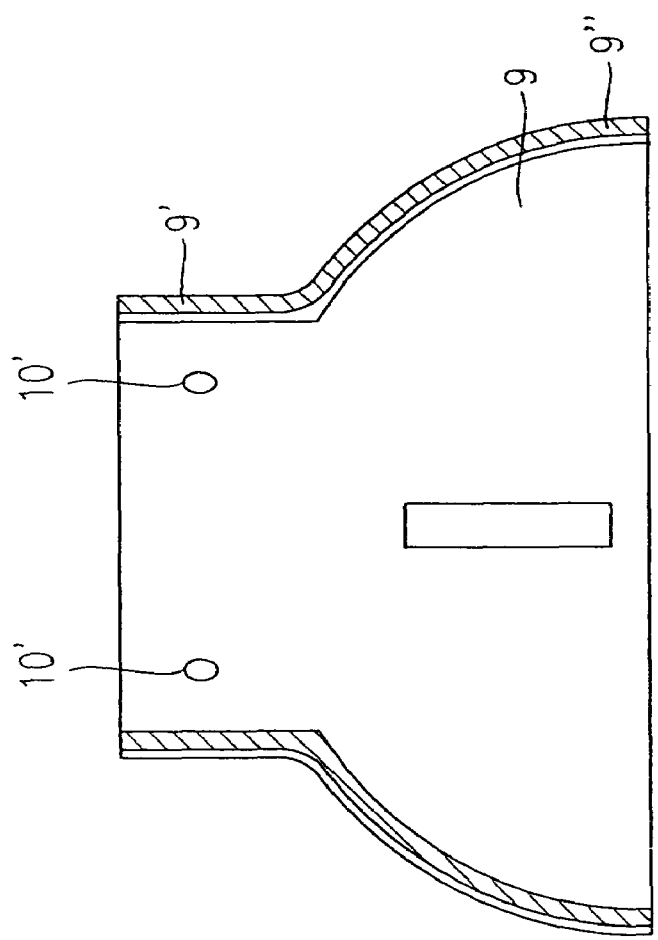

ARTICULATED SUSPENSION

BACKGROUND OF THE INVENTION

1. Field of the Invention

The invention relates to an articulated suspension device in particular for support systems of electronic appliances such as e.g. monitors.

Suspension devices for support systems are currently used e.g. in the field of medicine. For every type of intervention, treatment, investigation or monitoring procedure carried out on a patient, the practitioner has at his disposal i.a. a wide variety of back-up functions, such as measuring, visualizing, lighting etc., that are realized by means of electronic appliances and/or systems. As these electronic appliances have to be variably positioned and aligned in dependence upon the position of the patient and the practitioner, the appliances are connected to a support system, which is fastened by an articulated suspension device realized e.g. by means of spring arms to the ceiling or to the walls of the room and may be aligned in a plurality of degrees of translatory and rotatory freedom within a limited range of motion. 2. Discussion of the Prior Art In order to achieve the smoothest possible rotational and tilting movements over a wide rotational and tilting range in the joints of the suspension device, almost exclusive use is made of spherical or part-spherical ball joints. From the utility model DE 93 01 268 U1, for example, it is known for the articulated joint to comprise an interface component carrying a joint ball as well as a connecting flange containing a joint-ball bearing. The rotational and tilting movement of the ball joint is effected by a part-spherical sliding movement of the joint ball in the joint-ball bearing. Whilst the internal diameter profile of the joint-ball bearing corresponds to the part-spherical surface profile of the joint ball, the external diameter profile corresponding to the internal profile of the connecting flange has a purely cylindrical shape.

This geometric simplification, which reduces the outlay for manufacture and assembly of the ball-joint bearing, is however achieved at the cost of considerable mechanical drawbacks. As forces may be transmitted at contact surfaces between various components only in orthogonal direction to the surface, forces acting in the connecting flange are introduced, because of the cylindrical interfaces between connecting flange and joint-ball bearing, only at right angles to the lateral cylinder surface and/or at right angles to the cylinder bases into the joint-ball bearing. An introduction of force into the joint-ball bearing that is radially symmetrical and directed towards the centre of the joint ball, such as is effective at the transition from the joint-ball bearing to the joint ball because of the spherical interface, is not possible. A homogeneous introduction of force into the ball joint bearing and hence an optimum transmission of force to the joint ball that leads to a deflection of the joint ball proportional to the force originally acting upon the connecting flange is therefore not possible. Rather, the non-radial component of the force acting upon the joint-ball bearing that cannot be transmitted to the joint ball leads to an undesirable reaction of force at the contact surfaces between connecting flange and joint-ball bearing as well as at the fastening elements between both components. These undesirable reactions of force lead at the said points to component wear owing to compression-, extension- or friction processes.

SUMMARY OF THE INVENTION

The underlying object of the present invention is therefore to provide an articulated suspension device which, by virtue of a suitable geometric design of the joint component combination of joint ball—joint-ball bearing—joint connecting flange, guarantees a homogeneous, i.e. radially symmetrical flow of force between these components.

The homogeneous guidance of the flow of force ensures an optimum distribution of force in radial and tangential direction and hence an adequate rotatory and translatory joint deflection. Undesirable wear phenomena at the joint components are therefore reduced to a minimum.

In a delimitation from the background art, the homogeneous radially symmetrical flow of force in the joint is realized by the joint components: suspension part, sliding band and connecting part, which exercise the functions of the joint ball, the joint-ball bearing and the connecting flange of the background art. The sliding movement of an annular sliding band, which is fastened to the part-spherical internal diameter profile of the connecting part, on the part-spherical external diameter surface of the suspension part leads to an articulated tilting and rotational movement between suspension part and connecting part. By virtue of the use of an annular sliding band of a constant thickness and by virtue of the construction of part-spherical contact surfaces between suspension part, sliding band and connecting part, the forces at the articulated points are guided in a radially symmetrical and hence homogeneous manner.

Advantageous developments of the invention are indicated in the sub-claims.

The articulated movement of the connecting part relative to the suspension part leads to the formation of a slot aperture between both components that has a different slot aperture width depending on the respective joint angle. To avoid dust deposits in the slot aperture and to protect against injuries caused by the trapping of body parts in the slot aperture, the suspension device preferably has an enclosure that covers the slot aperture, on the one hand, in as space-saving a manner as possible and, on the other hand, as comprehensively as possible for all aperture widths.

To avoid damage to the wiring cable integrated in the suspension device, a restriction of the rotational movement of the connecting part relative to the suspension part to 360° is preferably provided.

BRIEF DESCRIPTION OF THE DRAWINGS

There now follows a detailed description of an embodiment of the invention with reference to the drawings. The drawings show:

FIG. 3a: a cross section through the enclosure and

FIG. 3b: a cross section, rotated through 90° relative to FIG. 3a, through the enclosure.

DETAILED DESCRIPTION OF THE INVENTION

The articulated suspension device according to the invention is explained below with reference to the drawings.

Figure 1:
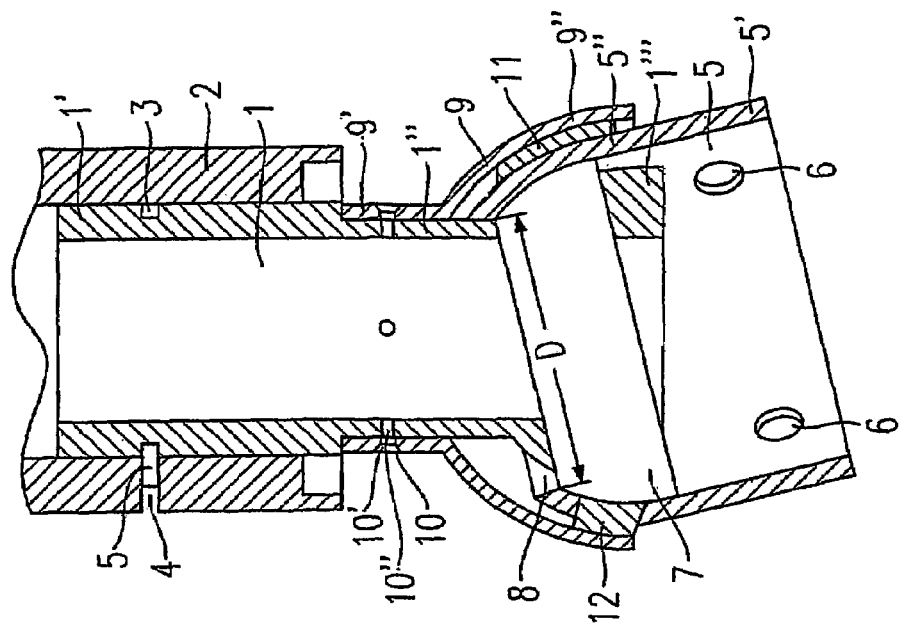
FIG. 1: an axial section through an embodiment of the articulated suspension device according to the invention in the non-deflected state.

In FIG. 1 an embodiment of an articulated suspension device in the non-deflected state is illustrated in cross section. The articulated suspension device comprises the rotationally symmetrical suspension part 1. This rotationally symmetrical suspension part 1 comprises three different portions 1', 1" and 1'''. The cylindrical portion 1', which is inserted by its full length in a hollow cylindrical spring arm 2, has a constant external diameter, which corresponds to the internal diameter of the hollow cylindrical spring arm 2. Outside the inner cylinder of the spring arm 2 the cylindrical portion 1' of the rotationally symmetrical suspension part 1 is adjoined by a further cylindrical portion 1" with a constant external diameter, which is reduced compared to the portion 1'. The end of the rotationally symmetrical suspension part 1 is formed by a portion 1''' having an external diameter profile which, according to claim 1, has a part-spherical contour. In the illustrated embodiment, the external diameter of the portion 1''' increases from the constant external diameter of the cylindrical portion 1" in accordance with a part-spherical profile to the equatorial diameter of a hemisphere corresponding to the part-spherical profile at the end of the portion 1''' that corresponds to one end of the rotationally symmetrical suspension part 1.

Fastening of the rotationally symmetrical suspension part 1 in the portion 1' to the spring arm 2 is effected by means of a fit joint. For this purpose, an annular groove 3 is provided in the lateral cylinder surface of the cylindrical portion 1' of the rotationally symmetrical suspension part 1. At the same height as the annular groove 3 of the rotationally symmetrical suspension part 1, through-openings 4 are provided in the hollow cylindrical spring arm at identical angular distances along a peripheral line. A preferably U-shaped fit element 5, which is inserted half in the annular groove 3 and half in the through-bore 4, prevents a movement of the suspension part 2 in axial direction and in direction of rotation relative to the spring arm 2.

Figure 2:
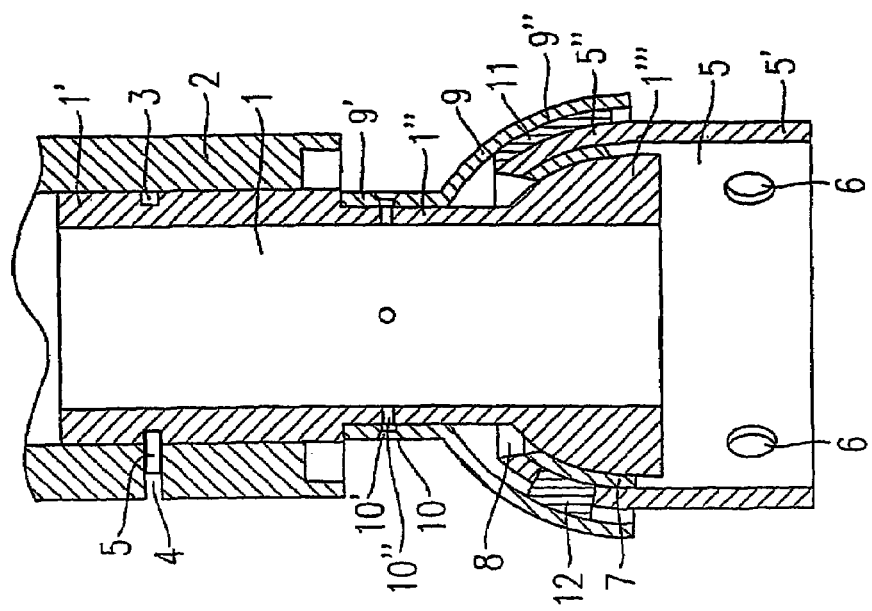
FIG. 2: the axial section of the articulated suspension device according to the invention in the deflected state.

Besides the suspension part 1, the joint component combination comprises the connecting part 5. This connecting part 5 is subdivided into a hollow cylindrical portion 5' with a constant external and internal diameter profile and a hollow cylindrical portion 5" with a part-spherical internal and external diameter contour. In the illustrated embodiment, the connecting part 5 has a constant wall thickness over all portions 5' and 5". The internal diameter of the hollow cylindrical portion 5' in the illustrated embodiment is larger by a specific amount than the maximum external diameter of the suspension part 1. The internal diameter of the connecting part 5 decreases in the portion 5" from the internal diameter of the portion 5' in accordance with the part-spherical external diameter contour of the suspension part 1 in the portion 1" to the internal diameter D illustrated in FIG. 2, so that upon suspension of the connecting part 5 on the suspension part 1 in the non-deflected state the clearance between the suspension part 1 in the portion 1''' and the connecting part 5 in the portion 5" is constant over the entire part-spherical contour profile. The internal diameter D defines the maximum tilting angle of the connecting part 5 relative to the suspension part 1. Because of the constant wall thickness of the connecting part 5 over the entire lateral cylinder surface, the external diameter profile in the portion 5" presents the same part-spherical profile as the corresponding internal diameter contour and the external diameter contour of the suspension part 1 in the portion 1'''.

For fastening the support system, in the illustrated embodiment a plurality of bores 6 are provided in the hollow cylindrical portion 5' of the connecting part 5 at identical angular distances along a peripheral line.

The third component of the joint component combination, which exercises the same function as the joint-ball bearing in the background art, is an annular sliding band 7. This annular sliding band is fastened to the inner lateral cylinder surface in the portion 5" of the connecting part 5. As it completely fills the sleeve-shaped, part-spherical gap between suspension part 1 in the portion 1''' and connecting part 5 in the portion 5", it is of a constant thickness and has an internal diameter profile corresponding to the part-spherical external diameter profile of the suspension part 1 as well as an external diameter profile corresponding to the part-spherical internal diameter profile of the connecting part 5.

The enclosure 9 needed to cover the slot aperture 8 situated between suspension part 1 and connecting part 5 comprises the hollow cylindrical portion 9' having a constant external and internal diameter and the hollow cylindrical portion 9" having a part-spherical contour profile. In the illustrated embodiment, the enclosure 9 has a constant wall thickness, which is smaller than the depth of the step formed on the suspension part 1 at the transition from portion 1' to portion 1". The constant internal diameter in the portion 9' corresponds to the constant external diameter of the suspension part 1 in the portion 1". The internal diameter in the portion 9" increases from the internal diameter in the portion 9' in accordance with the part-spherical external diameter contour of the connecting part 5 in the portion 5" to the equatorial diameter of a hollow sphere corresponding to the part-spherical profile, so that, given a space-saving covering of the slot aperture 8 and of the portion 5" of the connecting part 5 by the enclosure portion 9" of the enclosure 9, the clearance between the connecting part 5 in the portion 5" and the enclosure 9 in the portion 9" is constant over the entire part-spherical contour profile.

The enclosure 9 in its portion 9' is fastened by a plurality of connections 10, which are distributed at identical angular distances along a peripheral line, in such a way to the portion 1" of the suspension part 1 that the entire portion 1' is surrounded by the enclosure 9. The connections 10 are realized by through-bores 10', which are distributed at identical angular distances along the peripheral line of the enclosure 9, and by bores 10" disposed concentrically therewith in the suspension part 1 as well as by matching connecting pins (not shown in FIGS. 1 and 2).

The rib 11 needed to restrict the rotational movement of the connecting part 5 relative to the suspension part 1 is fastened in axial direction along the internal profile of the enclosure 9 in the portion 9". For this purpose, the rib 11 at its underside has in axial direction the same part-spherical contour as the internal profile of the enclosure 9 in the portion 9". In order to guarantee the freedom of rotation between enclosure 9 and connecting part 5, the upper side of the rib 11 likewise has a corresponding part-spherical contour profile, wherein the constant height of the rib 11 between upper side and underside is designed to be smaller than the constant clearance between the external contour of the connecting part 5 and the internal profile of the enclosure 9. The rib 12 corresponding to the rib 11 is disposed likewise in axial direction along the external contour of the connecting part 5 in the portion 5". So that the freedom of rotation between enclosure 9 and connecting part 5 is not impeded by the rib 12 either, the rib 12 at its upper side also has a corresponding part-spherical contour profile. The constant height of the rib 12 is of a smaller dimension than the constant clearance between the external contour of the connecting part 5 and the internal contour of the enclosure 9.

The invention-specific mode of operation of the articulated suspension device arises from the sliding movement of the annular sliding band 7 with its part-spherically curved inner surface along the part-spherically curved outer surface of the suspension part 1 in the portion 1", which movement gives rise to a corresponding tilting and/or rotational movement of the connecting part 5 relative to the suspension part 1. Because of the constant thickness of the annular sliding band 7 and the part-spherical construction of all of the contact surfaces between suspension part 1, sliding band 7 and connecting part 5 a homogeneous, radially symmetrical flow of force inside the spherical joint is possible, thereby markedly reducing the wear of the joint parts.

The invention claimed is:

1. An articulated suspension device, in particular for monitor support systems, comprising a suspension part having an end with a part-spherical external profile, a connecting part suspended on the suspension part, a sliding part disposed between the suspension part and the connecting part and enabling a sliding rotational and tilting movement of the connecting part relative to the suspension part, wherein the sliding part is an annular sliding band, which has a constant thickness and an internal profile of which corresponds to the spherical external profile of the end of the suspension part, and that the connecting part has an end with a part-spherical internal profile, which corresponds to a spherical external profile of the annular sliding band, wherein for fastening a support system to the connecting part a plurality of bores are provided below the spherical end thereof; and wherein there is provided an enclosure for covering a slot aperture produced by the articulated suspension between the suspension part and the connecting part, said enclosure covering the slot aperture in a close-fitting manner so as to comprehend all joint-position-dependent slot aperture widths.

2. The articulated suspension device according to claim 1, wherein the suspension part outside of the part-spherical end has a cylindrical shape and the connecting part outside of its part-spherical end has a hollow cylindrical shape.

3. The articulated suspension device according to claim 1, wherein the suspension of the connecting part on the suspension part is effected by supporting the annular sliding band, which is fastened to the spherical end of the connecting part, on the spherical end of the suspension part.

4. The articulated suspension device according to claim 1, wherein the articulated suspension in three degrees of freedom is effected by a rotational and tilting movement of the annular sliding band along the spherically curved surface of the end of the suspension part.

5. The articulated suspension device according to claim 1, wherein the enclosure compromises comprises a component of the connecting part having a hollow cylindrical portion and an adjoining hollow spherical-segment-shaped portion of an, in both portions, constant and thin wall thickness, and the internal diameter of the hollow cylindrical portion corresponds to the minimum external diameter of the suspension part, and the internal diameter of the hollow spherical-segment-shaped portion corresponds to the, by a specific amount, enlarged spherically profiled external diameter of the connecting part.

6. The articulated suspension device according to claim 1, wherein the enclosure in the hollow cylindrical portion is fastened by at least one connection to the suspension part in the region of minimum external diameter thereof.

7. The articulated suspension device according to claim 5, wherein a restriction of the range of rotation of the connecting part relative to the angular position of suspension part occurs.

8. The articulated suspension device according to claim 7, wherein on the inner side of the hollow spherical-segment-shaped portion of the enclosure a rib is fastened, the height of which is smaller than the clearance between the enclosure and the connecting part, and at the same time on the outer sides of the connecting part in the region of the spherical end thereof a further rib is fastened, which is likewise smaller than the clearance between the enclosure and the connecting part, wherein the ribs mutually block each other after a 360° rotational movement of the connecting part relative to the suspension part.

* * * * *